United States Patent
Mi et al.

(10) Patent No.: US 10,528,997 B2
(45) Date of Patent: Jan. 7, 2020

(54) SYSTEM FOR CUSTOMIZING AN INGREDIENT COMPOSITION

(71) Applicant: DRSIGNAL BIOTECHNOLOGY CO., LTD, New Taipei (TW)

(72) Inventors: Hsin-Wu Mi, New Taipei (TW); Yuan-Ting Chuang, New Taipei (TW); Ming-Cheng Lee, New Taipei (TW); Ting-Chieh Lin, New Taipei (TW); Yi-Hao Huang, New Taipei (TW)

(73) Assignee: DRSIGNAL BIOTECHNOLOGY CO., LTD., New Taipei (TW)

( * ) Notice: Subject to any disclaimer, the term of this patent is extended or adjusted under 35 U.S.C. 154(b) by 288 days.

(21) Appl. No.: 15/809,396

(22) Filed: Nov. 10, 2017

(65) Prior Publication Data

US 2018/0240175 A1 Aug. 23, 2018

(30) Foreign Application Priority Data

Feb. 23, 2017 (TW) .............................. 106106076 A

(51) Int. Cl.
*G06Q 30/00* (2012.01)
*G06Q 30/06* (2012.01)
*G06Q 10/08* (2012.01)

(52) U.S. Cl.
CPC ......... *G06Q 30/0621* (2013.01); *G06Q 10/08* (2013.01); *G06Q 30/0641* (2013.01)

(58) Field of Classification Search
CPC .......................... G06Q 30/0635; G06Q 50/30
See application file for complete search history.

(56) References Cited

U.S. PATENT DOCUMENTS

| | | | |
|---|---|---|---|
| 2002/0004749 A1* | 1/2002 | Froseth ................. | G06Q 10/08 705/16 |
| 2003/0065552 A1* | 4/2003 | Rubinstenn .......... | A45D 44/005 705/26.7 |
| 2015/0202143 A1* | 7/2015 | Dubois ................. | A61K 8/922 424/401 |

OTHER PUBLICATIONS https://web.archive.org/web/20140315183755/http://www.ewg.org/skindeep/site/about.php (Year: 2014).*

* cited by examiner

*Primary Examiner* — Matthew E Zimmerman
(74) *Attorney, Agent, or Firm* — J.A. Lindeman & Co. PLLC; Jeffrey Lindeman

(57) ABSTRACT

A system includes an online shopping platform, a ingredient database assembly and a control unit. The control unit transmits to the online shopping platform entries of active ingredient data and preservative ingredient data respectively corresponding to an active ingredient and a preservative ingredient and respectively stored in an active ingredient database and a preservative ingredient database of the ingredient database assembly, for allowing selection of at least one of the entries via the online shopping platform to result in a desired formula. The desired formula is used for subsequent production of a customized ingredient composition when it is determined that the desired formula conforms with rules of formulation.

7 Claims, 3 Drawing Sheets

SYSTEM FOR CUSTOMIZING AN INGREDIENT COMPOSITION

CROSS-REFERENCE TO RELATED APPLICATION

This application claims priority of Taiwanese Patent Application No. 106106076, filed on Feb. 23, 2017.

FIELD

The disclosure relates to a system for customizing an ingredient composition.

BACKGROUND

For most personal care products available on the market, since formulas and ratios between ingredients thereof of the personal care products have been decided and are usually fixed, it is hard to find a product that suits all consumers perfectly. Therefore, consumers may have to spend considerable time and money to find personal care products most suitable to their personal needs.

Moreover, costs other than manufacturing costs, such as advertising costs and distribution costs, of a personal care product are oftentimes reflected in a higher selling price to be paid by consumers. In order to maintain a competitive pricing scheme, a manufacture may cut back on the manufacturing costs by using inferior materials, which may be harmful to a human body.

SUMMARY

Therefore, an object of the disclosure is to provide a system for customizing an ingredient composition that can alleviate at least one of the drawbacks of the prior art.

According to one aspect of the disclosure, the system includes an online shopping platform, an ingredient database assembly and a control unit. The ingredient database assembly includes an active ingredient database and a preservative ingredient database. The active ingredient database is configured to store an entry of active ingredient data which is associated with an active ingredient. The preservative ingredient database is configured to store an entry of preservative ingredient data which is associated with a preservative ingredient. The control unit is electrically connected to the ingredient database assembly, and is communicable with the online shopping platform. The control unit includes a formulation module that stores rules of formulation of personal care products. The control unit is configured to transmit to the online shopping platform the entry of active ingredient data and the entry of preservative ingredient data, for allowing selection of at least one of the entry of active ingredient data or the entry of preservative ingredient data via the online shopping platform to result in a desired formula. The control unit is further configured to execute the formulation module to determine whether the desired formula conforms with the rules of formulation. The desired formula is used for subsequent production of a customized ingredient composition when it is determined that the desired formula conforms with the rules of formulation.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
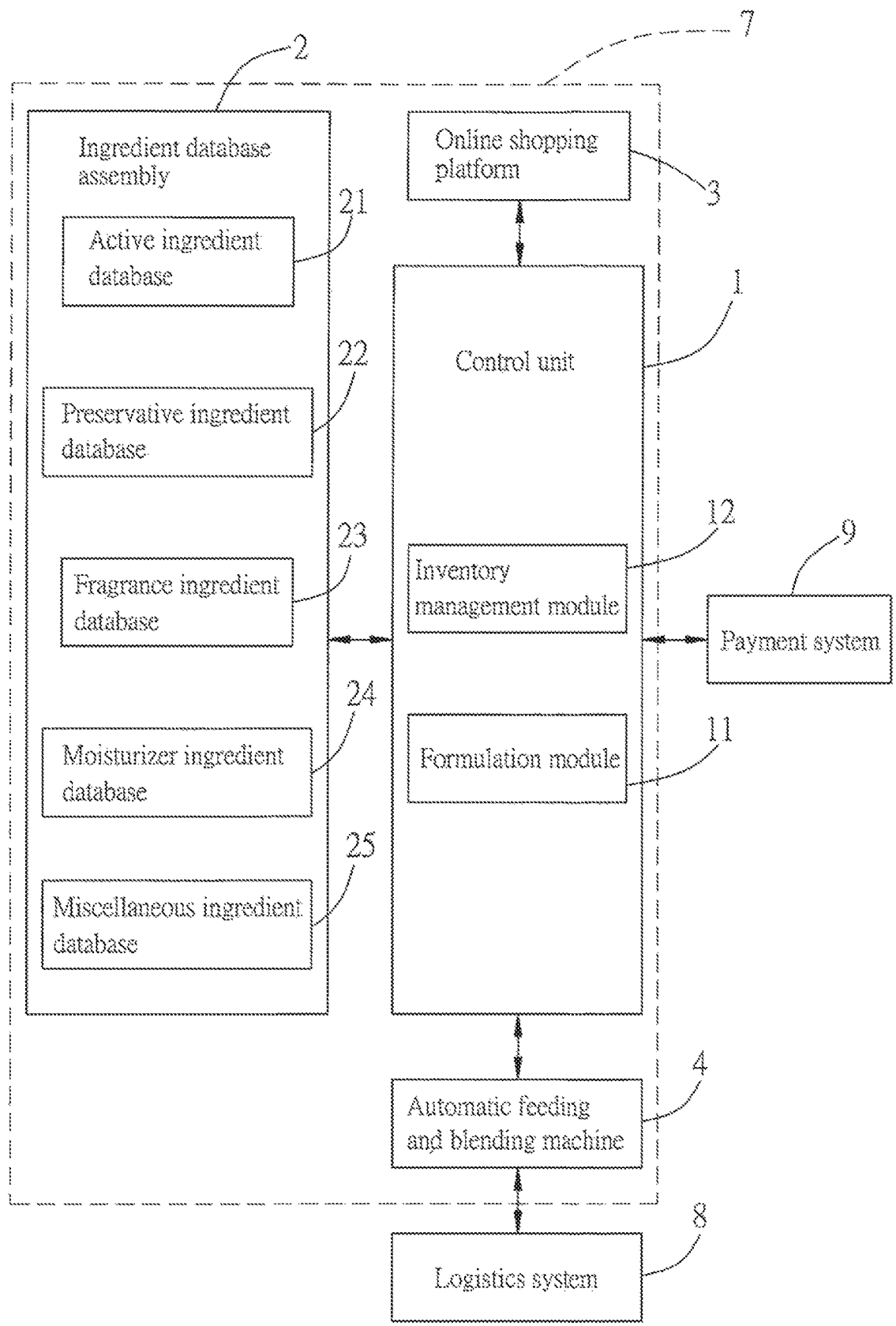
FIG. 1 is a block diagram illustrating an embodiment of a system for customizing ingredient composition according to the disclosure.

Referring to FIG. 1, an embodiment of a system 7 for customizing an ingredient composition according to the disclosure is illustrated. The ingredient composition is for example a personal care product. The system 7 includes a control unit 1, an ingredient database assembly 2, an online shopping platform 3 and an automatic feeding and blending machine 4. In this embodiment, the control unit 1, the ingredient database assembly 2 and the online shopping platform 3 are implemented by separate servers, but implementations thereof are not limited thereto. Specifically, the control unit 1 may be a computing server providing computing resources. In some embodiments, the control unit 1, the ingredient database assembly 2 and the online shopping platform 3 may be implemented by a single integrated server. Additionally, in this embodiment, the online shopping platform 3 may be implemented as a web server or a mobile application server to provide a user interface via a webpage or a mobile application software (mobile app), so as to enable a user to operate the system 7 remotely through a computer network, e.g., the Internet, that interconnects a computer which displays the webpage or a mobile phone which executes the mobile app with the online shopping platform 3, but implementation of the user interface may vary in other embodiments.

The ingredient database assembly 2 includes an active ingredient database 21, a preservative ingredient database 22, a fragrance ingredient database 23, a moisturizer ingredient database 24 and a miscellaneous ingredient database 25.

The active ingredient database 21 is configured to store at least one entry of active ingredient data which is associated with an active ingredient. The active ingredient is implemented for example by a lipid, a protein, a substance containing an organic solvent (e.g., ethanol, which is also called alcohol), a lipid-soluble substance, a water-soluble substance, a hypersaline substance, or the like. Take saccharomycopsis ferment filtrate, which bears a trade name of "Pitera", as an example of the active ingredient for explanation. An entry of active ingredient data corresponding to Pitera may include information such as "Ingredient: Pitera", "Source: China", "Effect: promote skin metabolism, reduce epidermal pigmentation, inhibit melanin production, and reduce appearance of fine lines and wrinkles", and "Price: 4 US dollars per gram".

The preservative ingredient database 22 is configured to store at least one entry of preservative ingredient data which is associated with a preservative ingredient. The preservative ingredient is for example, implemented by a substance containing an organic solvent, a water-soluble substance, or the like.

The fragrance ingredient database 23 is configured to store at least one entry of fragrance ingredient data which is associated with a fragrance ingredient. The fragrance ingredient is implemented for example by a lipid, a protein, a substance containing an organic solvent, a lipid-soluble substance, a water-soluble substance or the like.

The moisturizer ingredient database 24 is configured to store at least one entry of moisturizer ingredient data which is associated with a moisturizer ingredient. The moisturizer ingredient is implemented for instance by a lipid, a protein, a substance containing organic solvent, a lipid-soluble substance, a water-soluble substance, etc.

The miscellaneous ingredient database 25 is configured to store at least one entry of miscellaneous ingredient data which is associated with a miscellaneous ingredient. The miscellaneous ingredient may be implemented by a lipid, an emulsifier, etc.

For the sake of clearer explanation, only one entry of active ingredient data associated with one particular active ingredient is given as an example hereinafter. However, in practice, multiple entries of active ingredient data respectively associated with multiple different active ingredients may be stored in the active ingredient database 21. Similar descriptions are application to the preservative ingredient data, the fragrance ingredient data, the moisturizer ingredient data, and the miscellaneous ingredient data hereinafter for explanatory purposes, but these do not impose a limitation on the quantity of data entries in actual practice.

The control unit 1 is electrically connected to the ingredient database assembly 2 and the automatic feeding and blending machine 4, and is communicable with the online shopping platform 3. The control unit 1 includes a formulation module 11 that stores rules of formulation of ingredient compositions, such as personal care products, and an inventory management module 12. In this embodiment, the formulation module 11 and the inventory management module 12 are implemented by application software that is executable by the control unit 1.

The rules of formulation may be developed by professionals or practitioners according to empirical experience and/or known recipes so as to prevent mixture of incompatible materials and to ensure that a desired formula for a customized ingredient composition, which includes at least one of the active ingredient, the preservative ingredient, the fragrance ingredient, the moisturizer ingredient or the miscellaneous ingredient, is reasonable. For example, the rules of formulation may include rules that a protein is not to be mixed with a substance containing organic solvent, that a lipid-soluble substance is not to be mixed with a water-soluble substance without an emulsifier, and that a hyper-saline substance is not to be mixed with an emulsifier which is low in Hydrophile-Lipophile Balance (HLB) number. In this embodiment, the hypersaline substance is not to be mixed with the emulsifier that is less than nine in HLB number. The rules of formulation may further include ratios between ingredients or orders of ingredients to be added during the process of manufacturing an ingredient composition. It is worth noting that the rules of formulation are not limited to the disclosure herein, and other rules may be applied based on different needs and considerations.

The inventory management module 12 is executed to determine whether supply of said at least one of the active ingredient, the preservative ingredient, the fragrance ingredient, the moisturizer ingredient or the miscellaneous ingredient is sufficient. It should be noted that in some embodiments, the inventory management module 12 may be executed to ensure that the aforementioned ingredients in stock are utilized before expiration according to information provided in the ingredient database assembly 2.

Upon being requested by the user through the online shopping platform 3 (when the user desires to make a customized ingredient composition), the control unit 1 is configured to access the ingredient database assembly 2 and to transmit, to the online shopping platform 3, the entry of active ingredient data, the entry of preservative ingredient data, the entry of fragrance ingredient data, the entry of moisturizer ingredient data and the entry of miscellaneous ingredient data, for allowing selection of at least one of the entry of active ingredient data, the entry of preservative ingredient data, the entry of fragrance ingredient data, the entry of moisturizer ingredient data or the entry of miscellaneous ingredient data via the webpage provided by the online shopping platform 3 or the mobile app whose back-end service is supported by the online shopping platform 3 to result in a desired formula for the customized ingredient composition. The control unit 1 is further configured to execute the formulation module 11 to determine whether the desired formula for the customized ingredient composition (e.g., a customized personal care product) conforms with the rules of formulation.

The desired formula is used for subsequent production of the customized ingredient composition (e.g., personal care product) when it is determined that the desired formula conforms with the rules of formulation. It is worth noting that, in this embodiment, the user has selected one or more entries of active ingredient data, one or more entries of preservative ingredient data, one or more entries of fragrance ingredient data, one or more entries of moisturizer ingredient data and one or more entries of miscellaneous ingredient data on the user interface, but this disclosure is not limited thereto.

Figure 2:
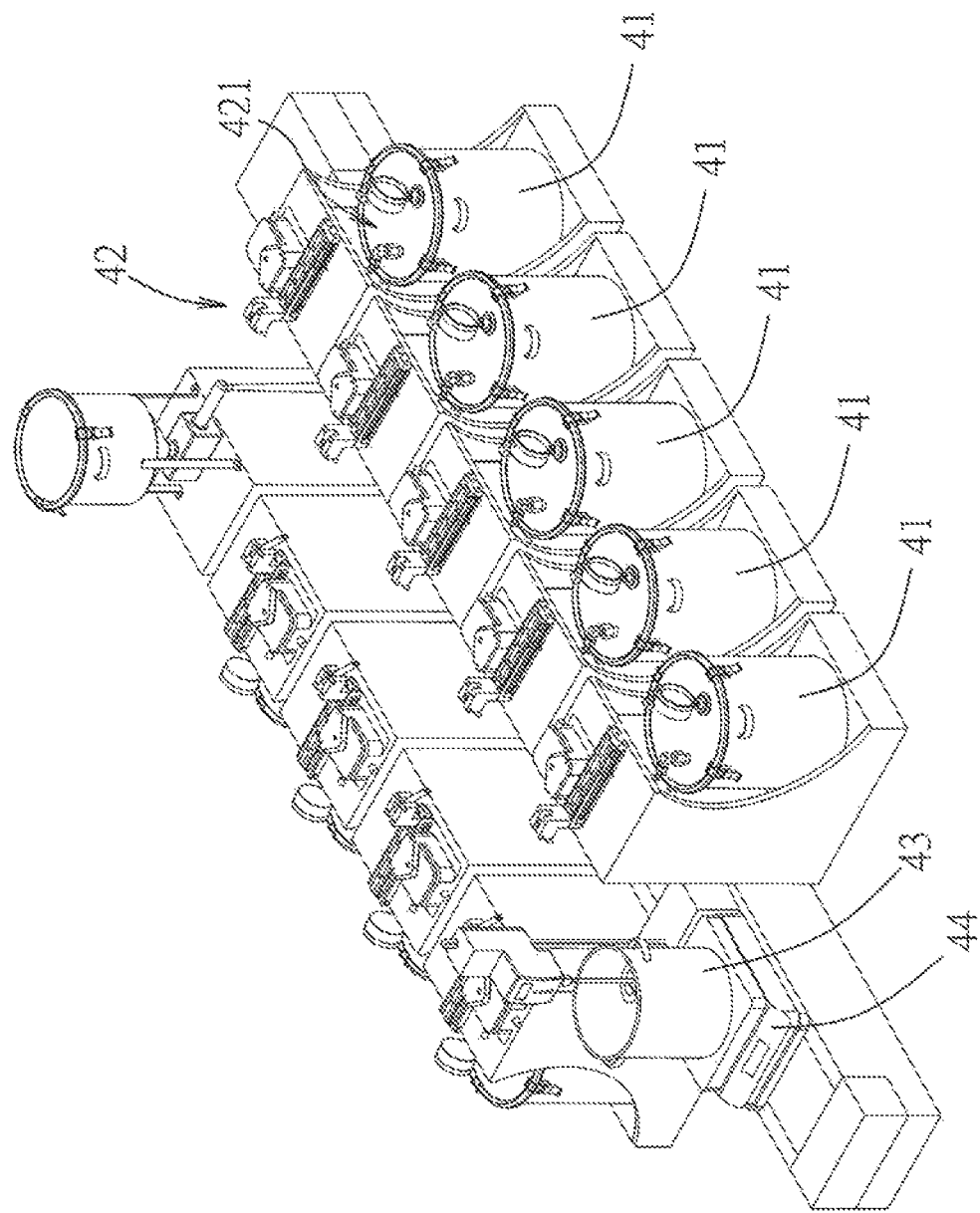
FIG. 2 is a schematic perspective view illustrating an embodiment of an automatic feeding and blending machine of the system of this disclosure.

Referring to FIG. 2, an embodiment of the automatic feeding and blending machine 4 is illustrated. The automatic feeding and blending machine 4 includes a plurality of ingredient containers 41, a plurality of feeding units 42, a mixing container 43 and a weight measuring unit 44.

Each of the plurality of ingredient containers 41 is modularly replaceable. In the depicted embodiment, there are ten ingredient containers 41, each of which is configured to store a respective one of the particular active ingredient, the particular preservative ingredient, the particular fragrance ingredient, the particular moisturizer ingredient and the particular miscellaneous ingredient respectively corresponding to the five existing entries of ingredient data in the ingredient database assembly 2. Each of the plurality of ingredient containers 41 is capable of adjusting storage temperature thereof to accommodate itself to the ingredient stored therein.

Each of the plurality of feeding units 42 is disposed at a respective one of the plurality of ingredient containers 41 so as to control feeding of the ingredient that is stored in the respective one of the plurality of ingredient containers 41. Each of the plurality of feeding units 42 includes a detector 421 that is configured to detect supply level (e.g., an amount) of the ingredient contained in the respective one of the plurality of ingredient containers 41, and to transmit a result of detection to the inventory management module 12. In this embodiment, each of the feeding units 42 is implemented by a peristaltic pump, but is not limited thereto. In addition, the detector 421 of each of the feeding units 42 may be implemented to detect the supply level of the ingredient stored in the respective one of the plurality of ingredient containers 41 by means of ultrasound or infrared, but is not limited thereto. It is worth to note that, for the sake of simplicity, only one feeding unit 42 and one detector 421 are labeled in FIG. 2.

The mixing container 43 is configured to receive the ingredient fed by one of the plurality of feeding units 42, and to mix the same with whatever ingredient that is already contained therein, if any, as from one or more other feeding units 42, so as to produce the customized ingredient composition (e.g., personal care product) or an intermediate mixture corresponding to the customized ingredient composition.

The weight determining unit 44 holds the mixing container 43 and is configured to determine (e.g., measure) weight of the mixing container 43 and what is received in the mixing container 43 so as to determine an amount of the material fed by said one of the plurality of feeding units 42. In this embodiment, the weight determining unit 44 is implemented by a weight scale, but is not limited thereto.

The control unit 1 is configured to control the automatic feeding and blending machine 4 to produce the customized ingredient composition automatically based on the desired formula when it is determined by the control unit 1, which executes the formulation module 11, that the desired formula conforms with the rules of formulation, and when it is determined by the control unit 1, which executes the inventory management module 12, that the supply of at least one of the active ingredient, the preservative ingredient, the fragrance ingredient, the moisturizer ingredient or the miscellaneous ingredient corresponding to said at least one of the aforementioned ingredient data thus selected is sufficient.

In some embodiments, the ingredient database assembly 2 further includes a popularity database and a recommendation database. The popularity database is configured to store at least one entry of popularity data which is associated with a number of times each entry of ingredient data (i.e., the entry of active ingredient data, the entry of preservative ingredient data, the entry of fragrance ingredient data, the entry of moisturizer ingredient data or the entry of miscellaneous ingredient data) has been previously selected. The recommendation database is configured to store at least one entry of recommendation data which is associated with a formula that has been successfully utilized to produce a customized ingredient composition. The popularity data and the recommendation data are accessible via the user interface provided by the online shopping platform 3 so as to assist the user in customizing appropriate ingredient compositions depending on their needs with relatively more popular ingredients or based on formulas that have been successfully utilized.

Further, referring to FIG. 1, a logistics system 8 may be utilized to deliver the customized ingredient composition thus produced.

Furthermore, a payment system 9 may be electrically connected to the system 7 so as to collect payment on the process of customizing ingredient composition. The payment system 9 may be implemented by one of a bank transfer service system, a credit card payment service system, and a third-party payment service system, but is not limited thereto.

Figure 3:
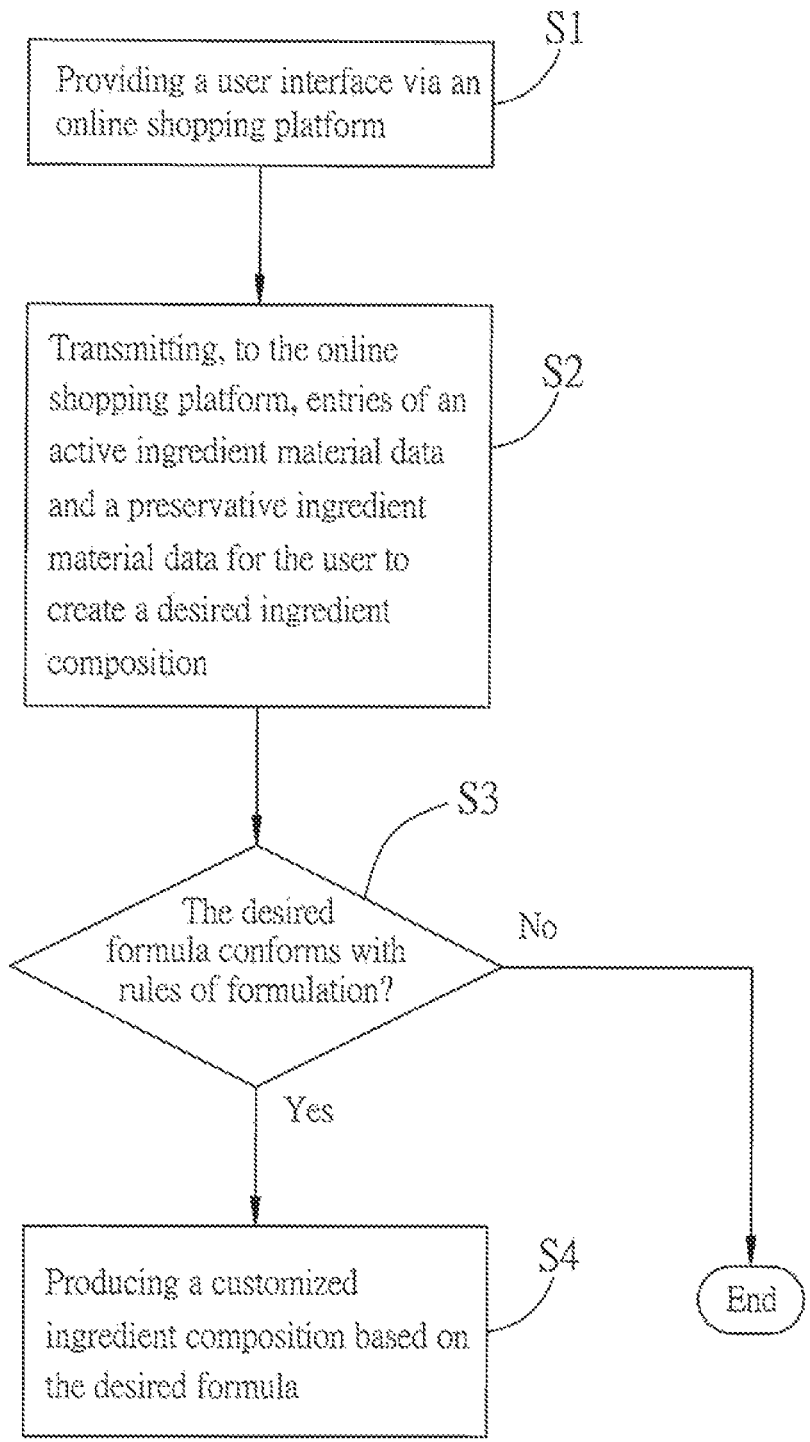
FIG. 3 is a flow chart illustrating an embodiment of a method for customizing ingredient composition according to this disclosure.

Referring to FIG. 3, a method for customizing ingredient composition is illustrated. The method is to be implemented by the above-mentioned system 7. The method includes steps S1-S4.

In step S1, the online shopping platform 3 provides the user interface via the webpage or the mobile app to enable the user to operate the system 7 through the computer network.

In step S2, the control unit 1 transmits, to the online shopping platform 3, the entry of active ingredient data and the entry of preservative ingredient data for allowing selection of at least one of the entry of active ingredient data or the entry of preservative ingredient data via the online shopping platform 3 to result in a desired formula.

In step S3, the control unit 1 determines whether the desired formula conforms with the rules of formulation based on the rules of formulation. When it is determined by the control unit 1 that the desired formula does not conform with the rules of formulation, an operation of the method terminates.

Otherwise (i.e., when it is determined by the control unit 1 that the desired formula conforms with the rules of formulation), the flow proceeds to step S4, where the automatic feeding and blending machine 4 produces the customized ingredient composition based on the desired formula.

In summary, the system 7 and the method of this disclosure enable the user to create a desired formula for subsequent production of a customized ingredient composition, such as a personal care product, by the automatic feeding and blending machine 4, total cost of the customized ingredient composition is controllable by the users. Also, the system 7 and the method of this disclosure ensure that the desired formula conforms with rules of formulation stored in the control unit 1 of the system 7, so that the desired formula is appropriate for manufacturing the customized ingredient composition.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A system for customizing an ingredient composition, the system comprising:
    an online shopping platform;
    an ingredient database assembly including
        an active ingredient database that is configured to store an entry of active ingredient data which is associated with an active ingredient, and
        a preservative ingredient database that is configured to store an entry of preservative ingredient data which is associated with a preservative ingredient;
    a control unit electrically connected to said ingredient database assembly, communicable with said online shopping platform, and including a formulation module that stores rules of formulation of personal care products;
        wherein said control unit is configured to transmit, to said online shopping platform, the entry of active ingredient data and the entry of preservative ingredient data, for allowing selection of at least one of the entry of active ingredient data or the entry of preservative ingredient data via said online shopping platform to result in a desired formula, and said control unit is further configured to execute said formulation module to determine whether the desired formula conforms with the rules of formulation;

wherein the desired formula is used for subsequent production of a customized ingredient composition based on said at least one of the entry of active ingredient data or the entry of preservative ingredient data thus selected, when it is determined that the desired formula conforms with the rules of formulation; and an automatic feeding and blending machine to produce the customized ingredient composition based on the desired formula from the control unit; and wherein:
the active ingredient is one of a lipid, a protein, a substance containing an organic solvent, a lipid-soluble substance, a water-soluble substance, and a hypersaline substance;

the preservative ingredient is one of a substance containing an organic solvent and a water-soluble substance; and the rules of formulation include rules that
a protein is not to be mixed with a substance containing organic solvent,
a lipid-soluble substance is not to be mixed with a water-soluble substance without an emulsifier, and
a hypersaline substance is not to be mixed with an emulsifier that is low in Hydrophile-Lipophile Balance (HLB) number, the emulsifier being less than nine in HLB number.

2. The system as claimed in claim 1, wherein:
said ingredient database assembly further includes
a fragrance ingredient database that is configured to store an entry of fragrance ingredient data which is associated with a fragrance ingredient,
a moisturizer ingredient database that is configured to store an entry of moisturizer ingredient data which is associated with a moisturizer ingredient, and
a miscellaneous ingredient database that is configured to store an entry of miscellaneous ingredient data which is associated with a miscellaneous ingredient; and
said control unit is further configured to transmit to said online shopping platform the entry of fragrance ingredient data, the entry of moisturizer ingredient data and the entry of miscellaneous ingredient data, for allowing selection of at least one of the entry of active ingredient data, the entry of preservative ingredient data, the entry of fragrance ingredient data, the entry of moisturizer ingredient data or the entry of miscellaneous ingredient data via said online shopping platform to result in the desired formula.

3. The system as claimed in claim 2, wherein the miscellaneous ingredient at least includes one of a lipid and an emulsifier.

4. The system as claimed in claim 3, wherein:
the fragrance ingredient is one of a lipid, a protein, a substance containing an organic solvent, a lipid-soluble substance and a water-soluble substance;
the moisturizer ingredient is one of a lipid, a protein, a substance containing organic solvent, a lipid-soluble substance and a water-soluble substance; and
said control unit is further configured to determine whether the desired formula conforms with the rules of formulation.

5. The system as claimed in claim 4, further comprising the automatic feeding and blending machine electrically connected to said control unit, wherein:
said automatic feeding and blending machine includes
a plurality of ingredient containers each of which is modularly replaceable, each of which is configured to store a respective one of the active ingredient, the preservative ingredient, the fragrance ingredient, the moisturizer ingredient and the miscellaneous ingredient, and each of which is capable of adjusting storage temperature thereof,
a plurality of feeding units each of which is disposed at a respective one of said plurality of ingredient containers so as to control feeding of what is stored in the respective one of said plurality of ingredient containers, and
a mixing container that is configured to receive what is fed by one of said plurality of feeding units, and to mix the same with whatever is inside said mixing container so as to produce the customized ingredient composition; and
said control unit further includes an inventory management module, and is configured to control said automatic feeding and blending machine to produce the customized ingredient composition based on the desired formula when it is determined by said control unit, which executes said formulation module, that the desired formula conforms with the rules of formulation, and when it is determined by said control unit, which executes said inventory management module, that supply level of at least one of the active ingredient, the preservative ingredient, the fragrance ingredient, the moisturizer ingredient or the miscellaneous ingredient corresponding to said at least one of the entry of active ingredient data, the entry of preservative ingredient data, the entry of fragrance ingredient data, the entry of moisturizer ingredient data or the entry of miscellaneous ingredient data thus selected is sufficient.

6. The system as claimed in claim 5, wherein each of said plurality of feeding units includes a detector that is configured to detect supply of what is stored in the respective one of said plurality of ingredient containers, and to transmit a result of detection to said supply management module.

7. The system as claimed in claim 6, wherein said automatic feeding and blending machine further includes a weight measuring unit that holds said mixing container and that is configured to measure weight of said mixing container and what has been received in said mixing container so as to determine an amount of what is fed by one of said plurality of feeding units.

* * * * *